US011745553B2

(12) United States Patent
Standifer

(10) Patent No.: US 11,745,553 B2
(45) Date of Patent: Sep. 5, 2023

(54) ADJUSTABLE CAPTURE PLATE FOR A FIFTH WHEEL HITCH

(71) Applicant: Ford Global Technologies, LLC, Dearborn, MI (US)

(72) Inventor: Cliff Standifer, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 269 days.

(21) Appl. No.: 17/335,906

(22) Filed: Jun. 1, 2021

(65) Prior Publication Data

US 2022/0379673 A1 Dec. 1, 2022

(51) Int. Cl.

*B60D 1/36* (2006.01)
*B60D 1/44* (2006.01)
*B62D 53/08* (2006.01)
*B60D 1/01* (2006.01)

(52) U.S. Cl.

CPC ............. *B60D 1/363* (2013.01); *B60D 1/015* (2013.01); *B60D 1/44* (2013.01); *B62D 53/0842* (2013.01)

(58) Field of Classification Search

CPC .......... B60D 1/363; B60D 1/015; B60D 1/44; B62D 53/0842

See application file for complete search history.

(56) References Cited

U.S. PATENT DOCUMENTS 5,890,728 A 4/1999 Zilm
6,135,482 A * 10/2000 Larkin .................. B60D 1/065 280/416.1
6,776,431 B1 * 8/2004 Dick .................. B62D 53/0828 280/425.2
7,703,792 B1 * 4/2010 Heitzmann .......... B62D 53/061 280/455.1
7,753,392 B2 * 7/2010 Warnock ............ B62D 53/0814 280/438.1
8,220,818 B1 * 7/2012 Pulliam ............. B62D 53/0814 280/441
8,672,340 B1 * 3/2014 Hartman ............. B62D 53/061 280/438.1
9,114,680 B2 8/2015 Hailman et al.
10,377,195 B2 8/2019 Pulliam et al.
2005/0082787 A1 * 4/2005 Dick .................. B62D 53/0842 280/433

OTHER PUBLICATIONS

Moussa, "Position and Displacement Analysis," University of Central Oklahoma, 10 pages.

* cited by examiner

*Primary Examiner* — Minnah L Seoh
*Assistant Examiner* — Ryan Edward Hardy
(74) *Attorney, Agent, or Firm* — Lorne Forsythe; Hanley, Flight & Zimmerman

(57) ABSTRACT

An adjustable capture plate for a fifth wheel hitch is disclosed. An example capture plate includes a skid plate couplable to a fifth wheel hitch, and a clamping system including, a base coupled to the skid plate, a pressure plate slidably coupled to the base, and a crank arm coupled to the pressure plate via a link, wherein rotation of the crank arm about an anchor pin of the base corresponds to linear travel of the pressure plate along the base, the pressure plate movable between a first position in which the pressure plate engages a pin box of a trailer and a second position in which the pressure plate is positioned away from the pin box.

20 Claims, 8 Drawing Sheets

ADJUSTABLE CAPTURE PLATE FOR A FIFTH WHEEL HITCH

FIELD OF THE DISCLOSURE

This disclosure relates generally to vehicles and, more particularly, to an adjustable capture plate for a fifth wheel hitch.

BACKGROUND

A trailer hitch is used to couple a trailer to a vehicle. Typically, the trailer hitch is coupled to a bed of the vehicle and further coupled to a pin box of the trailer. A capture plate is coupled between the pin box and a head of the trailer hitch. The capture plate prevents rotation of the pin box relative to the head, thus enabling the head to rotate with the trailer during turns of the vehicle.

SUMMARY

An example capture plate disclosed herein includes a skid plate couplable to a fifth wheel hitch, and a clamping system including a base coupled to the skid plate. A pressure plate is slidably coupled to the base, and a crank arm coupled to the pressure plate via a link. Rotation of the crank arm about an anchor pin of the base corresponds to linear travel of the pressure plate along the base. The pressure plate is movable between a first position in which the pressure plate engages a pin box of a trailer and a second position in which the pressure plate is positioned away from the pin box.

An example apparatus disclosed herein includes a skid plate, and first and second clamping systems coupled to the skid plate at opposite ends of the skid plate. The first and second clamping systems are movable between a clamped position and a release position. The first and second clamping systems in the clamped position are spaced apart by a first distance. The first and second clamping systems in the release position are spaced apart by a second distance, the second distance greater than the first distance. Each of the first and second clamping systems includes a base track fixedly coupled to the skid plate. A pressure plate is coupled to the base track via a piston slidable within the base track, and a crank arm is rotationally coupled to the piston via a link. Rotation of the crank arm about an anchor pin disposed in the base track causes linear travel of the pressure plate between the clamped position and the release position.

An example method disclosed herein includes coupling a clamping system to a skid plate by coupling a base to the skid plate, coupling a pressure plate to the base, the pressure plate slidable relative to the base, and coupling a crank arm to the pressure plate via a link. Rotation of the crank arm about an anchor pin of the base corresponds to linear travel of the pressure plate relative to the base. The pressure plate is movable between a first position in which the pressure plate engages a pin box of a trailer and a second position in which the pressure plate is positioned away from the pin box.

Figure 1:
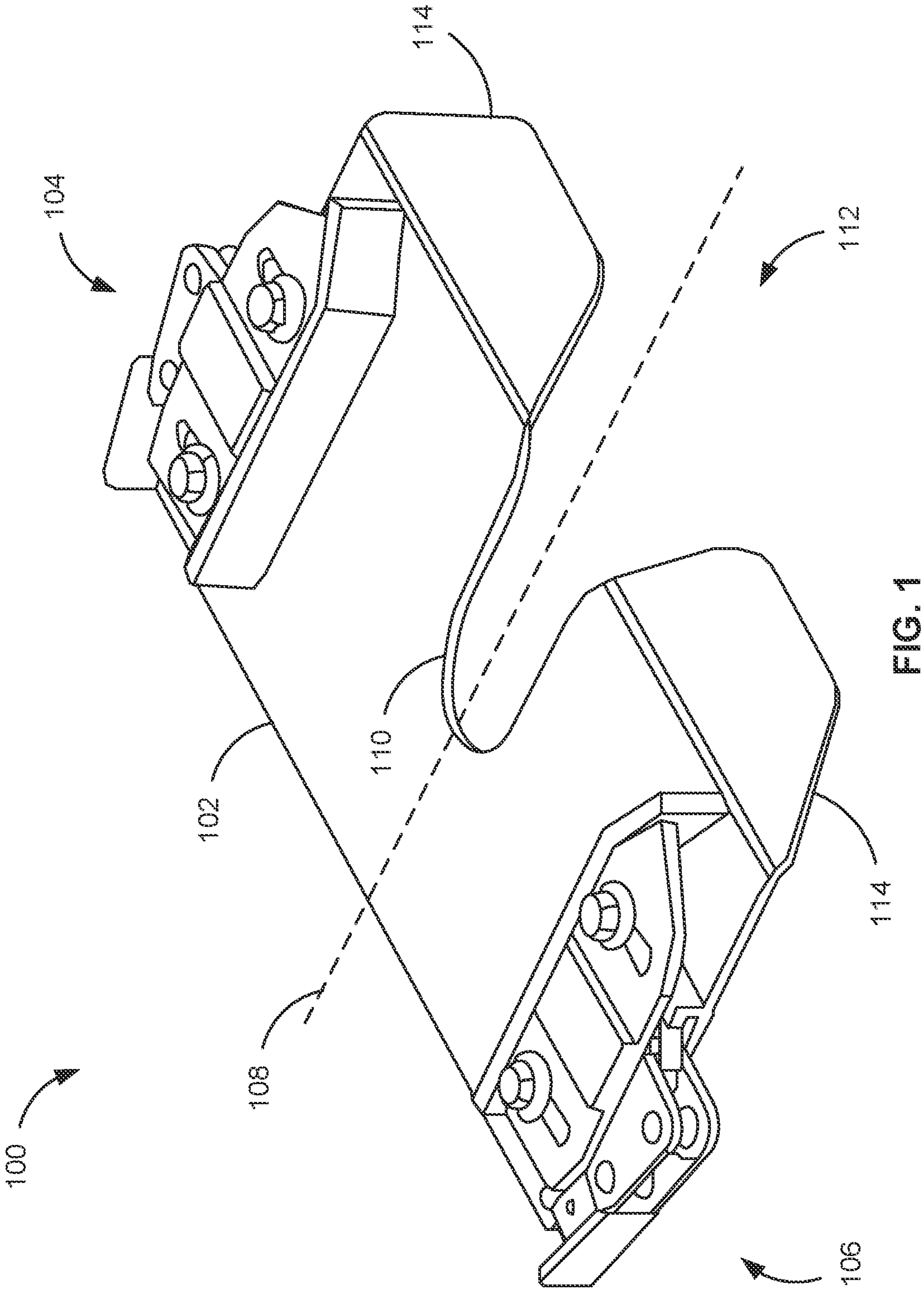
FIG. 1 illustrates an example capture plate in accordance with teachings of this disclosure.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

A trailer hitch (e.g., fifth wheel hitch) is typically used to couple a trailer to a vehicle (e.g., truck). A trailer hitch includes a base coupled to a vehicle subframe and a head to be coupled to the trailer. As the vehicle turns, the head rotates with the trailer. In some cases, a capture plate is coupled to the head of the trailer hitch. The capture plate receives a pin box of the trailer, and the capture plate prevents rotation of the pin box relative to the trailer hitch head, such that the pin box and, thus, the trailer rotate with the trailer hitch head.

Some known capture plates are mounted to an underside of the pin box via a set screw. In some cases, the set screw can loosen and/or fall off of the pin box, causing the trailer to detach from the trailer hitch and, in some examples, cause damage to the trailer and/or the vehicle. Alternatively, some known capture plates are secured to the pin box via bolts. As such, some known capture plates require holes to be drilled into the pin box, which may be difficult for some pin boxes based on a material of the pin box. In some such cases, welding is required to secure the capture plate to the pin box, thereby reducing convenience and/or ease of installation for a consumer. In some cases, known capture plates are specific to a particular type of pin box and/or a particular size range of the pin box. As such, different capture plates are used for different pin box types and/or sizes.

Some known capture plates are mounted to the trailer hitch head instead of the pin box. Such known capture plates secure the trailer to the trailer hitch by clamping down on the pin box to prevent removal and/or rotation of the pin box relative to the trailer hitch head. For some known capture plates, a clamping operation is controlled by manually tightening and loosening nuts (e.g., jam nuts, hex jam nuts) of the capture plate using a wrench. In some cases, when the trailer is to be disconnected from the vehicle, the nuts are loosened to unclamp the capture plate from the pin box. Conversely, to secure the trailer to the vehicle, the nuts are tightened via the wrench. As such, some known capture plates require use of a separate tool (e.g., a wrench) for connecting to trailer to and/or disconnecting the trailer from the vehicle. Furthermore, connection of the trailer to and/or disconnection of the trailer from the vehicle may occur under adverse operating conditions (e.g., in a remote location, at night, and/or during inclement weather). Accordingly, such a separate tool, appropriately sized for the dimensions of the jam nuts, may be unavailable and/or may be difficult to use under such adverse operating conditions.

Examples disclosed herein enable securing of a pin box to a trailer hitch head using an adjustable capture plate (e.g., a universal capture plate). The example adjustable capture plate disclosed herein is mounted to the trailer hitch head, and the adjustable capture plate can be adjusted to accommodate a range of sizes of the pin box. In examples disclosed herein, the adjustable capture plate includes an example skid plate couplable to the trailer hitch head, and example clamping systems coupled to the skid plate at opposite ends of the skid plate. In some examples, the clamping systems are manually operated (e.g., without the use of a separate tool) to move between an open position (e.g., a release position) and a closed position (e.g., a clamping position). When the clamping systems are in the open position, the pin box is movable relative to the skid plate, such that a king pin of the pin box can be positioned within the trailer hitch head. When the king pin and/or the pin box are appropriately positioned relative to the trailer hitch head, the clamping systems can be manually moved to the closed position in which example pressure plates of the clamping systems engage sides of the pin box. In such examples, the pressure plates apply a clamping force on the pin box to prevent removal and/or rotation thereof relative to the trailer hitch head.

In examples disclosed herein, each of the clamping systems includes an example base (e.g., a track, a base track) coupled to a skid plate, where the skid plate is couplable to the trailer hitch head. An example piston is coupled to and slidable along the base, and an example pressure plate is coupled to the piston. In some examples, an example crank arm is coupled to the piston and/or the pressure plate via an example link. The crank arm rotates about an example anchor pin through the base, and rotation of the crank arm causes linear travel of the piston and, thus, linear travel of the pressure plate relative to the base. As such, the pressure plate is movable between a first position in which the pressure plate engages a pin box of a trailer and a second position in which the pressure plate is positioned away from the pin box.

Advantageously, examples disclosed herein enable manual operation of the clamping systems between the clamping and release positions without the use of a separate tool (e.g., a wrench, a screwdriver, etc.). Accordingly, examples disclosed herein reduce the time and/or physical exertion required to perform such clamping and/or release operations, thus improving ease of use for a consumer. Furthermore, the example capture plate disclosed herein is adjustable for a range of sizes of the pin box. As such, examples disclosed herein reduce the need to manufacture multiple capture plates for different sizes of the pin box and, thus, examples disclosed herein reduce a number of parts required and/or reduce manufacturing costs associated with the capture plate.

FIG. 1 illustrates an example capture plate (e.g., an adjustable capture plate, a universal capture plate) 100 in accordance with teachings of this disclosure. The example capture plate 100 of FIG. 1 is couplable to a head (e.g., a trailer hitch head) of a trailer hitch (e.g., a fifth wheel hitch) and further couplable to a pin box of a trailer. In the illustrated example of FIG. 1, the capture plate 100 includes an example skid plate 102 and example clamping systems 104, 106 coupled thereto. In this example, the clamping systems 104, 106 are positioned at opposite ends of the skid plate 102. The clamping systems 104, 106 are substantially the same, and are mirrored across an example central axis 108 of the capture plate 100.

In some examples, the skid plate 102 is coupled (e.g., bolted, welded) to a top surface of the trailer hitch head. In other examples, the skid plate 102 is integrated into the trailer hitch head. In this example, the skid plate 102 includes an example cutout 110 proximate an example rearward-facing end 112 of the skid plate 102. In some examples, the cutout 110 receives a king pin of the pin box. In this example, example front portions 114 of the skid plate 102 are tapered toward the rearward-facing end 112 to enable guiding of the king pin into the cutout 110. Furthermore, the front portions 114 are bent downward to facilitate sliding of the pin box onto the skid plate 102.

In this example, when the king pin is positioned within the cutout 110, the clamping systems 104, 106 can be manually operated to clamp on sides of the pin box. In some examples, when the clamping systems 104, 106 are in a clamping position, the clamping systems 104, 106 prevent rotation of the pin box relative to the trailer hitch head.

Figure 2:
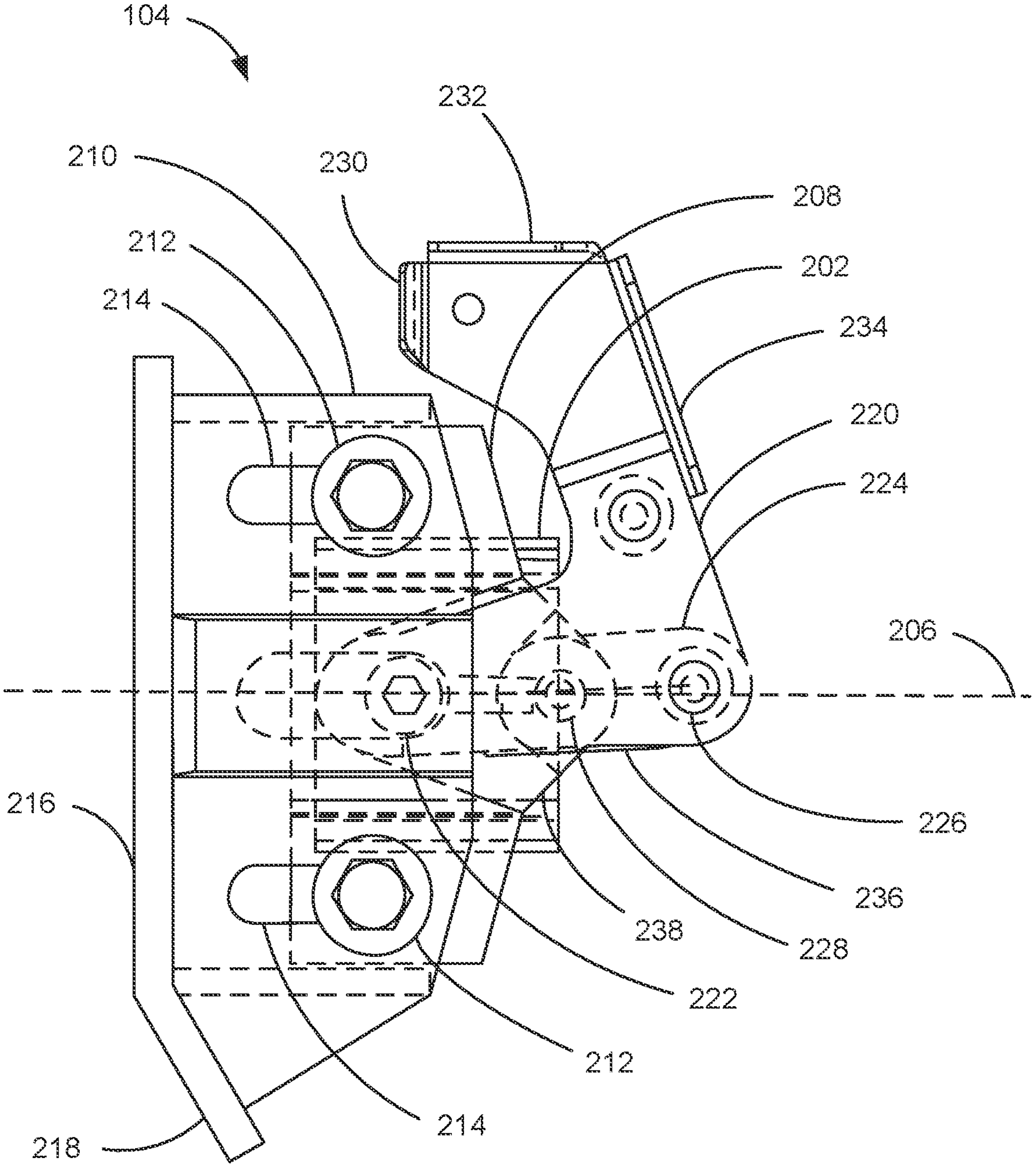
FIG. 2 illustrates an example clamping system of the example capture plate of FIG. 1.

FIG. 2 illustrates one of the example clamping systems 104, 106 of the example capture plate 100 of FIG. 1. While the first clamping system 104 is shown in this example, the second clamping system 106 of FIG. 1 is substantially the same as the first clamping system 104. As such, a description of the first clamping system 104 in FIG. 2 can be equally applied to the second clamping system 106 of FIG. 1. In the illustrated example of FIG. 2, the first clamping system 104 includes an example base (e.g., a track, a base track) 202 couplable to the skid plate 102 of FIG. 1. In some examples, the base 202 is bolted and/or welded to the skid plate 102. In other examples, the base 202 is integrated into the skid plate 102. In this example, the base 202 is symmetric, such that the base 202 of the first clamping system 104 and the base 202 of the second clamping system 106 can be interchangeably coupled to ends of the skid plate 102.

In this example, an example piston 208 is slidably coupled to the base 202, and the piston 208 is slidable along an example travel axis 206. Furthermore, an example pressure plate 210 is coupled to the piston 208 via example bolts (e.g., hex flange bolts) 212. In this example, the bolts 212 are disposed in example openings (e.g., slots, elongated openings) 214 of the pressure plate 210, where the openings 214 are elongated. In some examples, a position of the pressure plate 210 relative to the piston 208 can be adjusted by adjusting a position of the bolts 212 within the openings 214. For example, the bolts 212 can be loosened (e.g., via a wrench), and the pressure plate 210 can be moved relative to the piston 208 along the travel axis 206 to adjust the position of the bolts 212 within the openings 214. When the pressure plate 210 is in a selected position relative to the piston 208, the bolts 212 are tightened to hold the pressure plate 210 in the selected position.

In this example, the pressure plate 210 includes an example flanged wall (e.g., upward flange) 216 that is oriented upward relative to the skid plate 102 of FIG. 1. In this example, the flanged wall 216 includes an example curved portion 218 at the rearward-facing end 112 of the skid plate 102 that curves away from a center of the skid plate 102. In some examples, the curved portion 218 facilitates sliding of the pin box onto the skid plate 102. In some examples, when the first clamping system 104 is in the clamping position, the flanged wall 216 engages a side of the pin box and applies a clamping force on the pin box. In some examples, the clamping force of the flanged wall 216 on the pin box is based on the position of the pressure plate 210 relative to the piston 208. In this example, the bolts 212 are in a rightmost position of the openings 214 in FIG. 2, such that the pressure plate 210 is in a leftmost position relative to the piston 208. In some examples, the clamping force of the flanged wall 216 decreases when the pressure plate 210 moves toward the rightmost position relative to the piston 208.

Furthermore, the first clamping system 104 is adjustable for different sizes of the pin box based on the position of the pressure plate 210 relative to the piston 208. For example, the pressure plate 210 in the leftmost position of FIG. 2 is at a first distance from the second clamping system 106 of FIG. 1. In some examples, the distance between the pressure plate 210 and the clamping system 106 increases when the pressure plate 210 is moved rightward relative to the piston 208 from the position shown in FIG. 2. In particular, when the pressure plate 210 is in the rightmost direction relative to the piston 208, the pressure plate 210 is at a second distance from the second clamping system 106, where the second distance is greater than the first distance. In some examples, the position of the pressure plate 210 relative to the piston 208 is selected based on a size of the pin box to be coupled to the capture plate 100 of FIG. 1, where the distance between the first and second clamping systems 104, 106 corresponds to the size of the pin box.

In the illustrated example of FIG. 2, an example crank arm 220 is coupled to the base 202 via an example anchor pin 222 disposed in the base 202. An example link 224 is rotatably coupled to the crank arm 220 at a first example pin joint 226 and is rotatably coupled to the piston 208 at a second example pin joint 228. In some examples, when the crank arm 220 rotates about the anchor pin 222, the link 224 rotates about the first and second pin joints 226, 228 and causes the piston 208 to slide along the base 202. In some examples, rotation of the crank arm 220 causes the pressure plate 210 to move between the clamping position (e.g., the closed position) in which the pressure plate 210 engages the pin box, and the release position (e.g., the open position) in which the pressure plate 210 is positioned away from the pin box. In some examples, a user manually rotates the crank arm 220 about the anchor pin 222. For example, the crank arm 220 includes an example flanged handle 230 having an upward vertical flange at which the user can apply a force to cause rotation of the crank arm 220. Furthermore, the crank arm 220 includes an example downward flange 232, an example upward flange 234, and an example tab 236. In some examples, the downward flange 232 contacts the skid plate 102 when the clamping system 104 is in the clamping position to prevent further rotation of the crank arm 220 in the counterclockwise direction of FIG. 2. In some examples, when the clamping system 104 is in the release position, the tab 236 contacts an edge of an example recess 238 of the piston 208 to prevent further rotation of the crank arm 220 in the clockwise direction of FIG. 2. The tab 236 and the recess 238 are further described below in connection with FIG. 4C.

Figure 3:
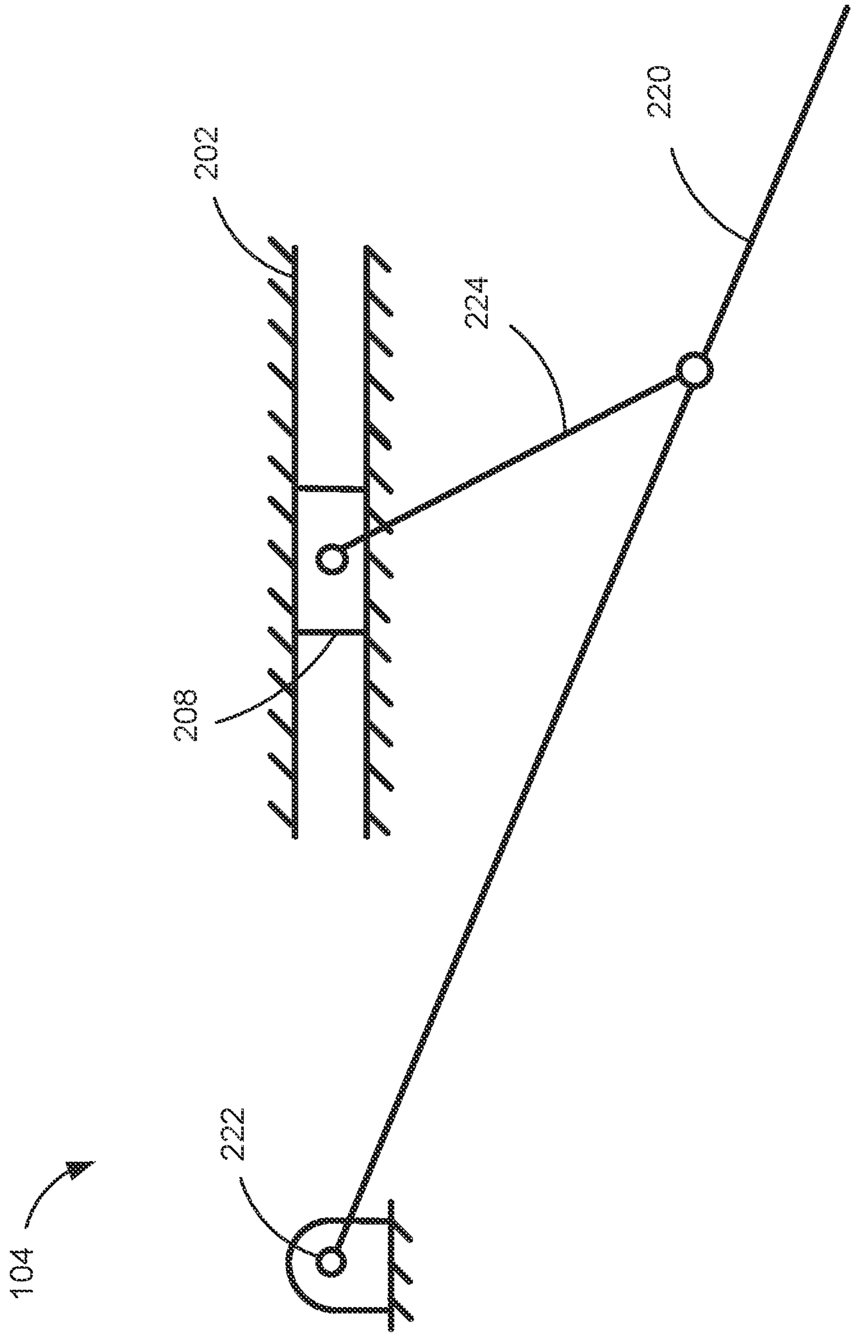
FIG. 3 is a schematic of the example clamping system of FIG. 2.

FIG. 3 is a schematic of the example clamping system 104 of FIG. 2. In this example, configuration of the crank arm 220, the link 224, and the piston 208 as shown in the illustrated example of FIG. 3 enables a toggle-like action of the clamping system 104. For example, as the crank arm 220 rotates about the anchor pin 222 in the counterclockwise direction in FIG. 3, the crank arm 220 applies a force on the piston 208 via the link 224. In such examples, the piston 208 is linearly constrained by the base 202 so that the force causes the piston 208 to travel in the leftward direction of FIG. 3, thus causing the pressure plate 210 of FIG. 1 to move toward and engage a pin box.

In this example, as the crank arm 220 rotates in the counterclockwise direction in FIG. 3, a mechanical advantage of the clamping system 104 increases, where the mechanical advantage is a ratio of an output force to an input force for the clamping system 104. In particular, the mechanical advantage corresponds to a ratio of the clamping force of the pressure plate 210 on the pin box relative to the input force manually applied on the crank arm 220 by a user. As such, by increasing the mechanical advantage of the clamping system 104, the clamping force of the pressure plate 210 on the pin box is increased for a given input force from the user. In some examples, the mechanical advantage of the clamping system 104 is based on a length of the crank arm 220, a length of the link 224, and/or an angular travel of the crank arm 220 about the anchor pin 222.

Figure 4B:
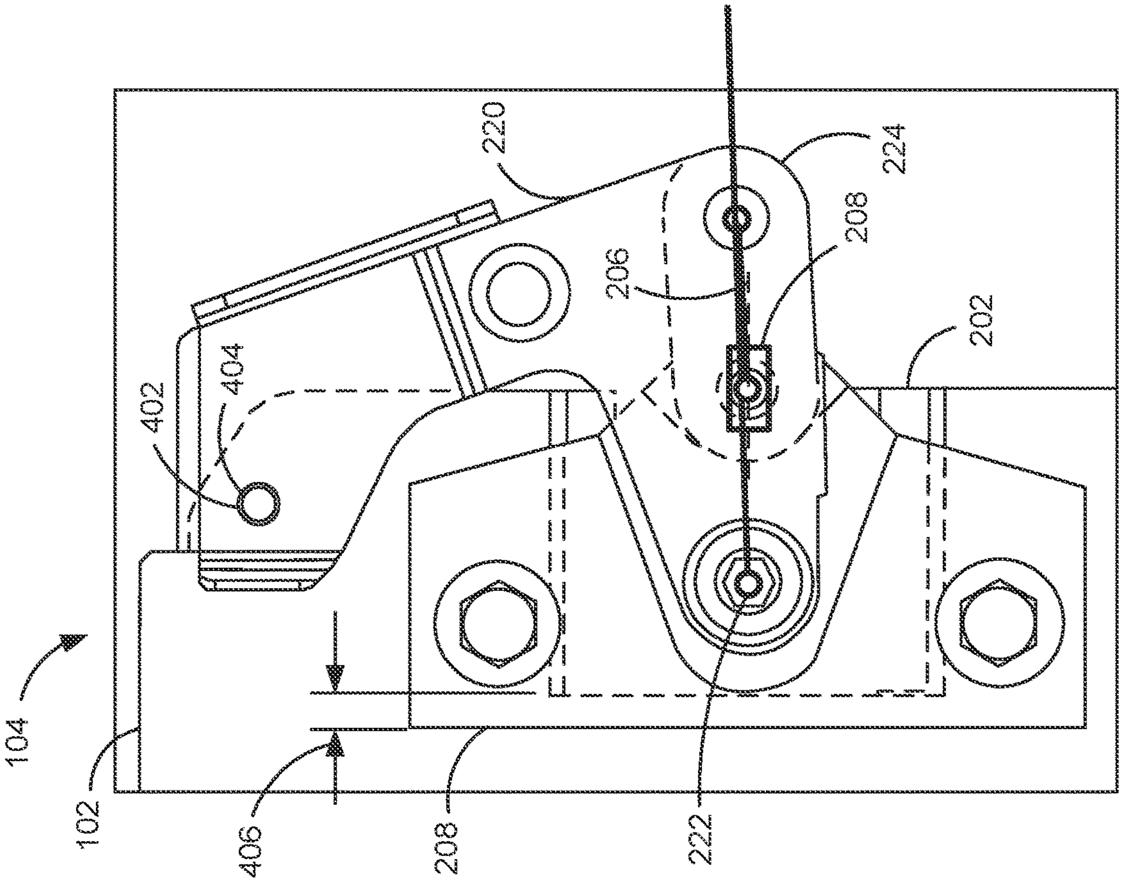
FIG. 4B illustrates the example clamping system of FIG. 2 in the clamping position.
Figure 4A:
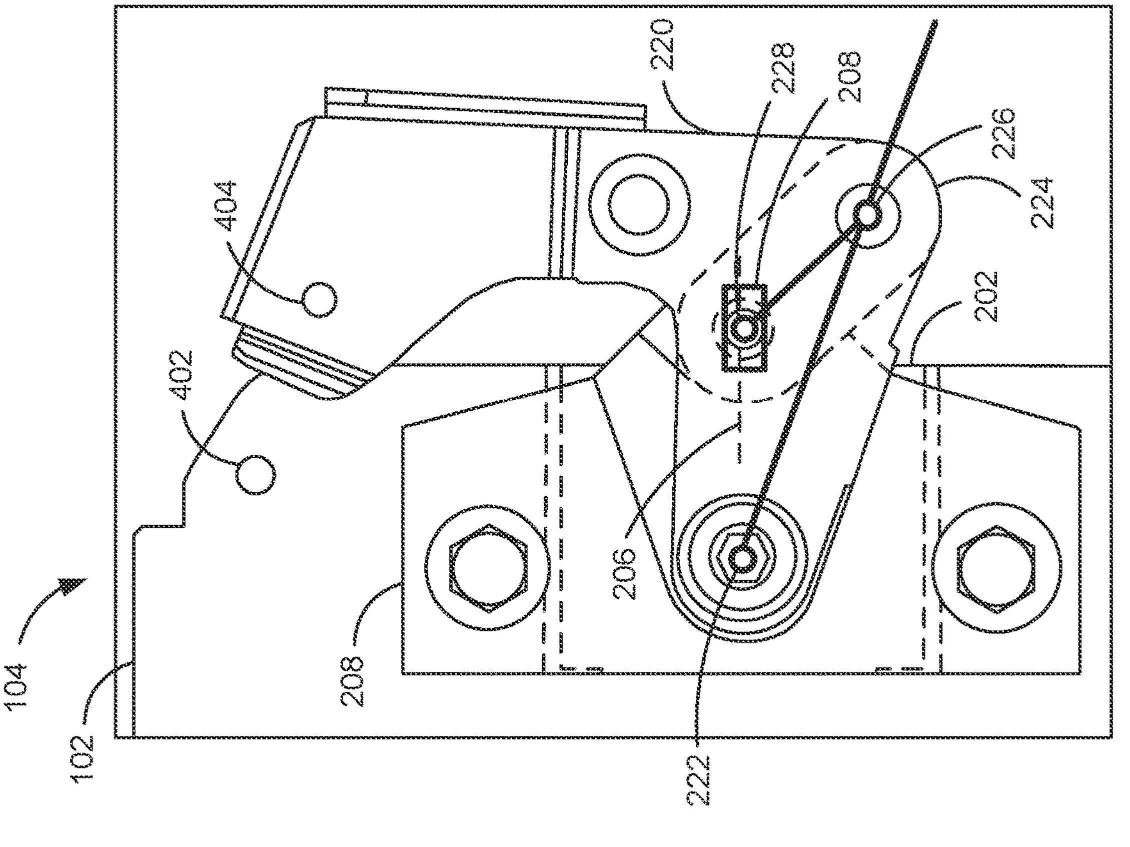
FIG. 4A illustrates the example clamping system of FIG. 2 in the release position.

FIGS. 4A and 4B illustrate the example clamping system 104 of FIG. 2 in the release position and the clamping position, respectively. In the illustrated example of FIG. 4A, the crank arm 220 is oriented clockwise about the anchor pin 222 relative to the travel axis 206. In such an example, the orientation of the crank arm 220 as shown in FIG. 4A results in a corresponding orientation of the link 224 relative to the first and second pin joints 226, 228 and, thus, results in the piston 208 and the pressure plate 210 of FIG. 2 being positioned rightward along the travel axis 206. In some examples, the pressure plate 210 in the release position of FIG. 4A does not contact a pin box of a trailer. In this example, the skid plate 102 includes a first example opening 402 and the crank arm 220 includes a second example opening 404.

Turning to FIG. 4B, the crank arm 220 is rotated counterclockwise relative to the position shown in FIG. 4A. In such an example, when the clamping system 104 moves from the release position of FIG. 4A to the clamping position of FIG. 4B, rotation of the crank arm 220 and the link 224 causes linear travel of the piston 208 and the pressure plate 210 leftward along the travel axis 206. In particular, the piston 208 and the pressure plate 210 move leftward by an example travel distance 406. In some examples, the travel distance 406 of the piston 208 is approximately one-quarter inch. In other examples, the travel distance 406 may be different based on a rotational travel of the crank arm 220, a length of the crank arm 220, and/or a length of the link 224. In some examples, the pressure plate 210 in the clamping position engages the pin box of the trailer to prevent and/or reduce rotation of the pin box relative to the skid plate 102. In some examples, the first opening 402 of the skid plate 102 and the second opening 404 of the crank arm 220 are substantially aligned when the clamping system 104 is in the clamping position. In some such examples, a pin (e.g., a clevis pin) is inserted into the first and second openings 402, 402 to prevent rotation of the crank arm 220 and, thus, lock the clamping system 104 in the clamping position.

Figure 4C:
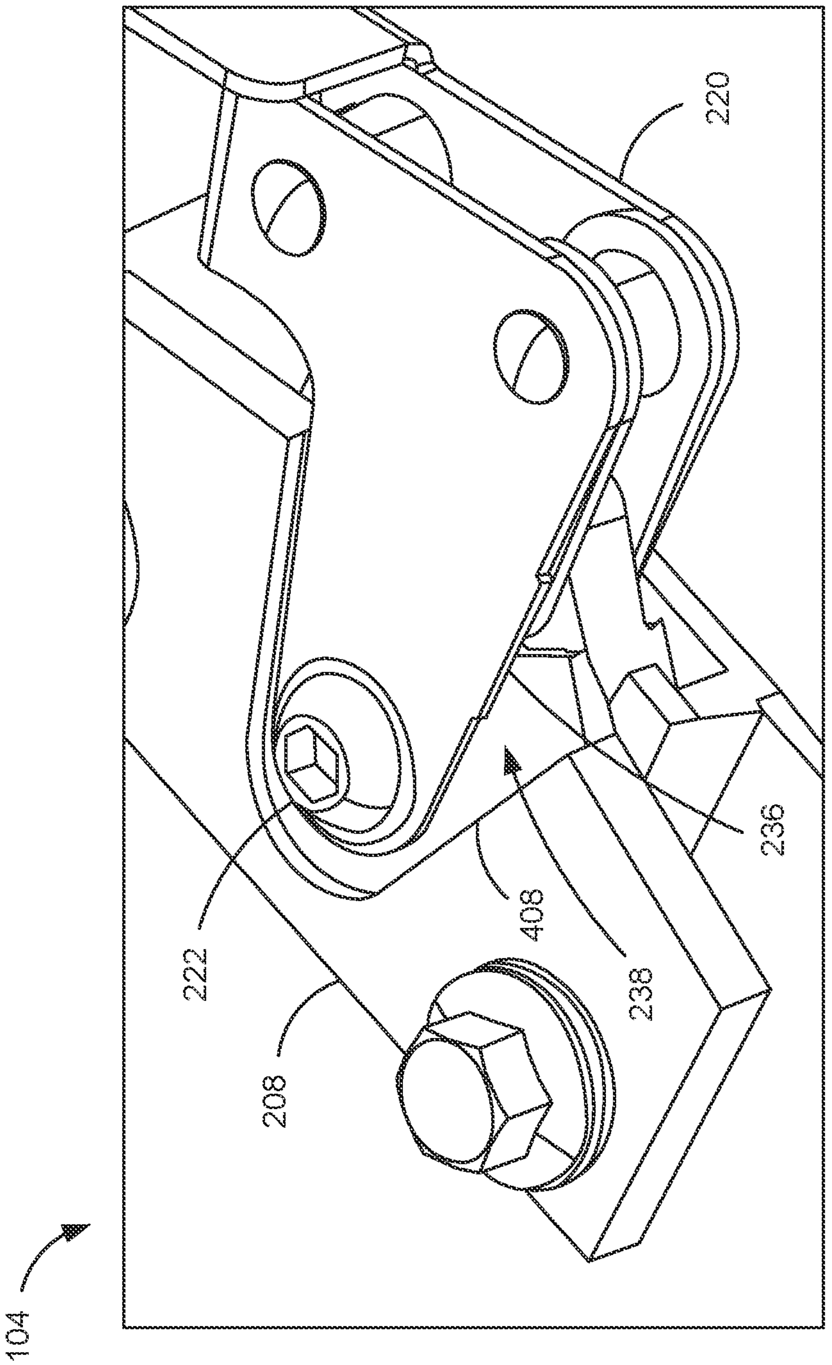
FIG. 4C is a detailed view of the example clamping system of FIG. 2 in the clamping position of FIG. 4B.

FIG. 4C is a detailed view of the example clamping system 104 in the clamping position of FIG. 4B. In the illustrated example of FIG. 4C, the crank arm 220 is rotatable relative to the piston 208 within the recess 238 of the piston 208. In some examples, the recess 238 restricts rotation of the crank arm 220 about the anchor pin 222. For example, when the crank arm 220 rotates clockwise about the anchor pin 222 in FIG. 4C, the tab 236 of the crank arm 220 contacts an example edge 408 of the recess 238. In such examples, contact between the edge 408 and the tab 236 prevents further rotation of the crank arm 220 in the clockwise direction.

Figure 5:
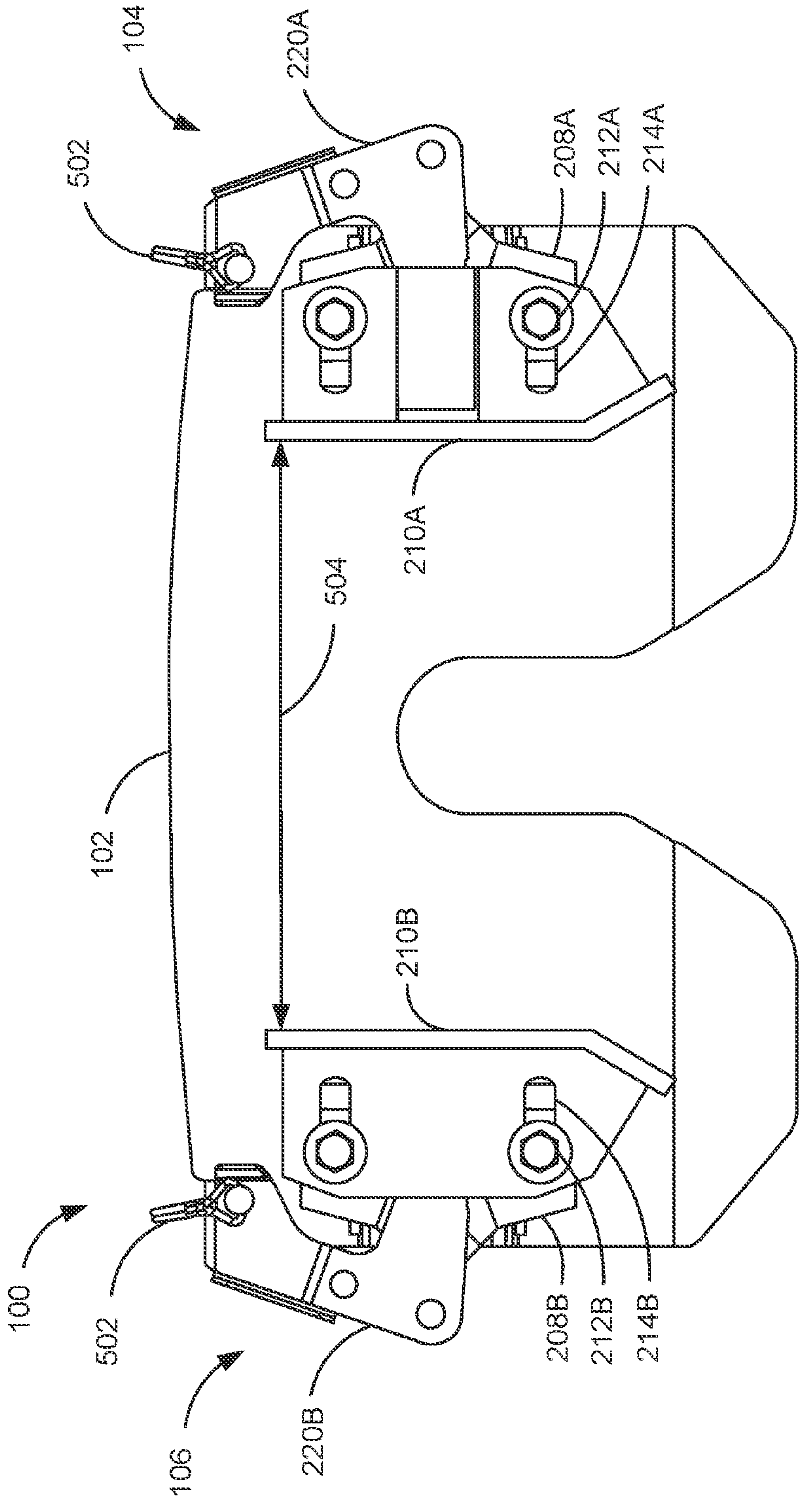
FIG. 5 illustrates the example capture plate of FIG. 1 configured to receive a pin box having a first width.

FIG. 5 illustrates the example capture plate 100 of FIG. 1 configured to receive a pin box having a first width. In the illustrated example of FIG. 5, characters A and B have been added to previous reference numerals to reference right and left sides, respectively, of the capture plate 100. In the illustrated example of FIG. 5, the example clamping systems 104, 106 are locked in the clamping position using example clevis pins 502 disposed in the skid plate 102 and crank arms 220A, 220B. In this example, bolts 212A of the first clamping system 104 are disposed in a rightmost position in openings 214A of a pressure plate 210A, and bolts 212B of the second clamping system 106 are disposed in a leftmost position in openings 214B of a pressure plate 210B. As such, the pressure plate 210A of the first clamping system 104 is positioned leftward relative to a piston 208A, and the pressure plate 210B of the second clamping system 104 is positioned rightward relative to a piston 208B.

In this example, the pressure plates 210A, 210B of the clamping systems 104, 106 are separated by an example first distance 504 when the clamping systems 104, 106 are in the clamping position. In some examples, the first distance 504 corresponds to a smallest width of the pin box that can be received by the capture plate 100. In this example, the first distance 504 is approximately 12 inches. In other examples, the first distance 504 may be different. For example, the first distance 504 can be adjusted by adjusting a size and/or geometry of the skid plate 102 and/or the clamping systems 104, 106. In some examples, the first distance 504 can be adjusted by adjusting positions at which the clamping systems 104, 106 are mounted on the skid plate 102.

Figure 6:
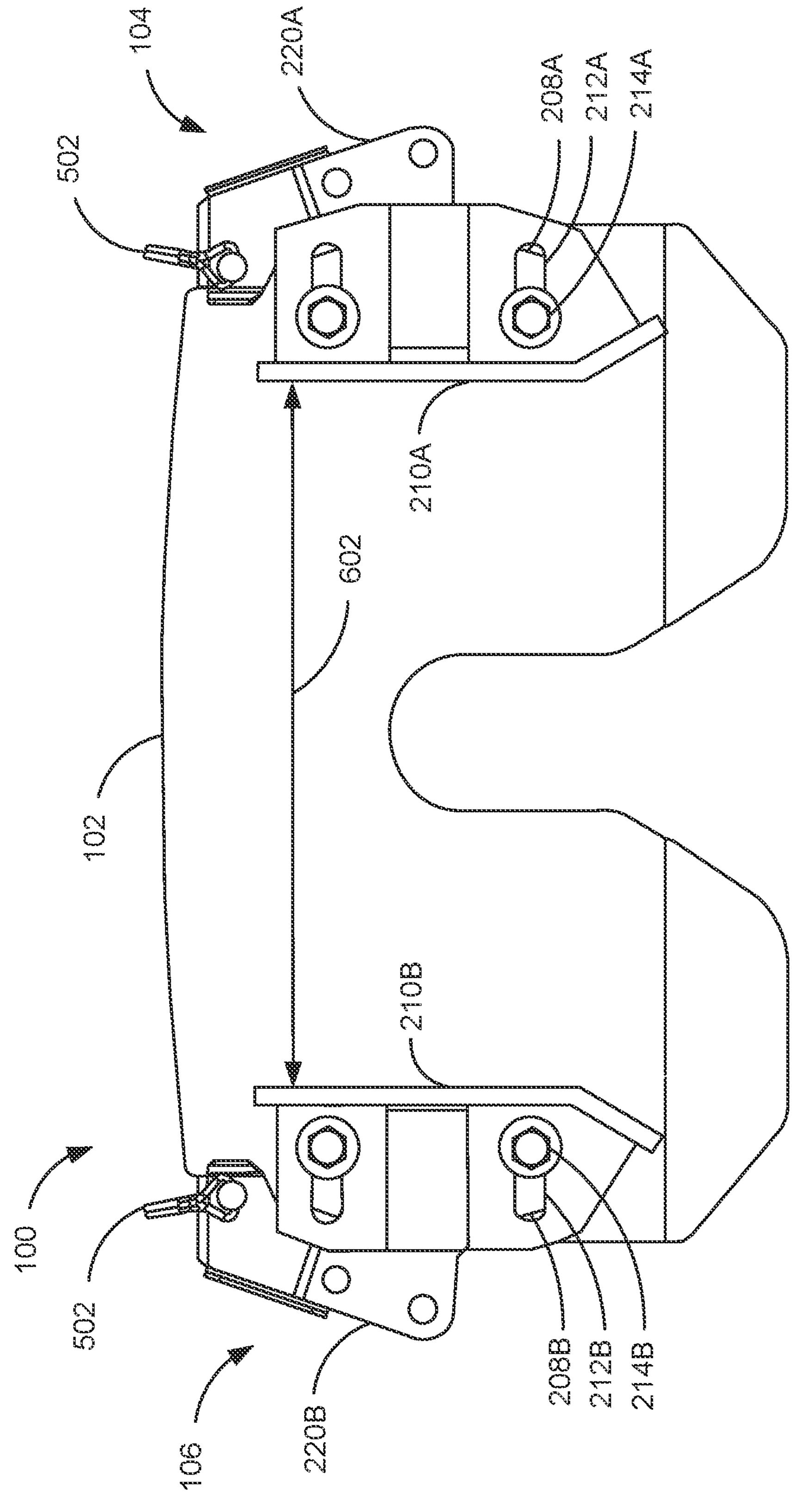
FIG. 6 illustrates the example capture plate of FIG. 1 configured to receive a pin box having a second width.

FIG. 6 illustrates the example capture plate 100 of FIG. 5 configured to receive a pin box having a second width. In the illustrated example of FIG. 6, characters A and B have been added to previous reference numerals to reference right and left sides, respectively, of the capture plate 100. In this example, the bolts 212A of the first clamping system 104 are disposed in a leftmost position in the openings 214A of the pressure plate 210A, and the bolts 212B of the second clamping system 106 are disposed in a rightmost position in the openings 214B of the pressure plate 210B. As such, the pressure plate 210A of the first clamping system 104 is positioned rightward relative to the piston 208A, and the pressure plate 210B of the second clamping system 104 is positioned leftward relative to the piston 208B.

In this example, the pressure plates 210A, 210B of the clamping systems 104, 106 are separated by an example second distance 602 when the clamping systems 104, 106 are in the clamping position. In some examples, the second distance 602 corresponds to a largest width of the pin box that can be received by the capture plate 100. In this example, the second distance 602 is approximately 14 inches. In other examples, the second distance 602 may be different. In some examples, the distance between the pressure plates 210A, 210B in the clamping position can be adjusted by adjusting a position of the bolts 212A, 212B within the corresponding openings 214A, 214B. For example, the distance between the pressure plates 210A, 210B is adjustable between the smallest width (e.g., 12 inches) shown in FIG. 5 and the largest width (e.g., 14 inches) shown in FIG. 6. In some examples, the distance is adjusted based on the width of the pin box to be received by the capture plate 100.

Figure 7:
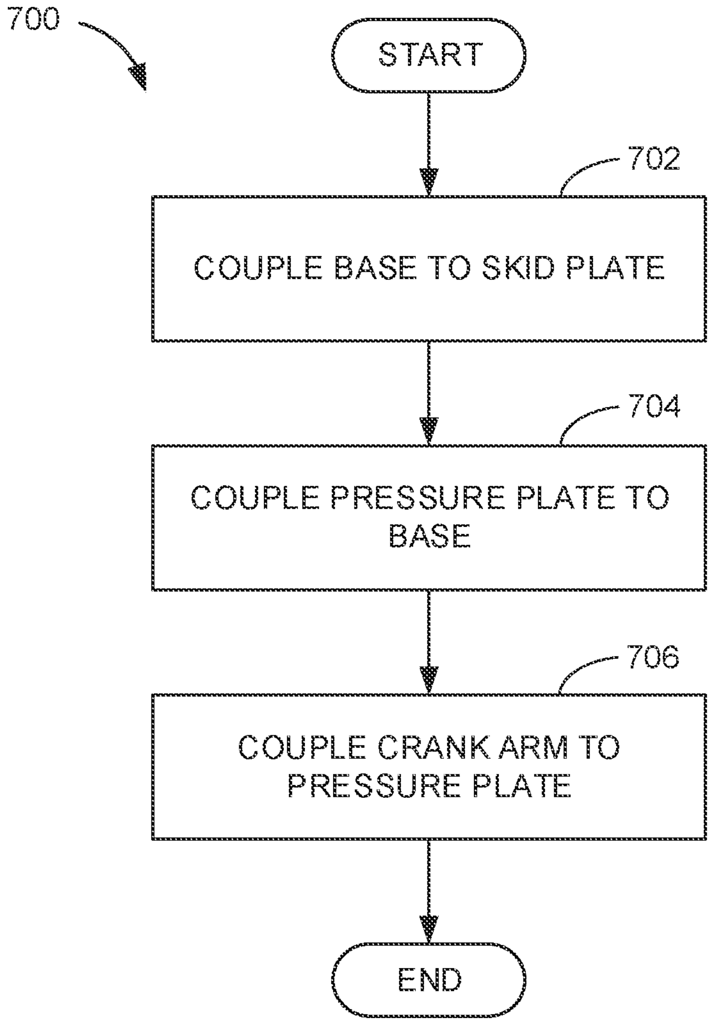
FIG. 7 is a flowchart representative of an example method to produce examples disclosed herein.

FIG. 7 is a flowchart representative of an example method 700 to produce examples disclosed herein. For example, the example method 700 may be implemented to produce the example capture plate 100 of FIGS. 1, 5, and/or 6. The example method of FIG. 7 begins at block 702, at which the example base 202 of FIGS. 2, 3, 4A, and/or 4B is coupled to the example skid plate 102 of FIGS. 1, 4A, 4B, 5, and/or 6.

At block 704, the example pressure plate 210 of FIGS. 2, 4A, 4B, 5, and/or 6 is coupled to the base 202. For example, the pressure plate 210 is coupled to the base 202 via the example piston 208 of FIGS. 2, 3, 4A, 4B, 5, and/or 6, such that the piston 208 and the pressure plate 210 are slidable along a track of the base 202.

At block 706, the example crank arm 220 of FIGS. 2, 3, 4A, 4B, 5, and/or 6 is coupled to the pressure plate 210 via the example link 224 of FIGS. 2, 3, 4A, 4B, 5, and/or 6. In some examples, rotation of the crank arm 220 about the example anchor pin 222 of FIGS. 2, 3, 4A, and/or 4B of the base 202 corresponds to linear travel of the pressure plate 210 between a first position (e.g., a clamping position, a closed position) and a second position (e.g., a release position, an open position).

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase “at least one of A and B” is intended to refer to implementations including any of (1) at least one A, (2) at least one B, and (3) at least one A and at least one B. Similarly, as used herein in the context of describing the performance or execution of processes, instructions, actions, activities and/or steps, the phrase “at least one of A or B” is intended to refer to implementations including any of (1) at least one A, (2) at least one B, and (3) at least one A and at least one B.

As used herein, singular references (e.g., “a”, “an”, “first”, “second”, etc.) do not exclude a plurality. The term “a” or “an” entity, as used herein, refers to one or more of that entity. The terms “a” (or “an”), “one or more”, and “at least one” can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

From the foregoing, it will be appreciated that example methods, apparatus and articles of manufacture have been disclosed that enable coupling of a trailer pin box to a fifth wheel hitch using an adjustable capture plate. The disclosed methods, apparatus and articles of manufacture enable manual operation of clamping systems of the adjustable capture plate between a clamping position, in which the clamping systems prevent rotation and/or removal of the trailer pin box, and a release position, in which the trailer pin box is movable relative to the adjustable capture plate. Advantageously, examples disclosed herein do not require use of a separate tool (e.g., a wrench, a screwdriver, etc.) to switch the adjustable capture plate between the clamping and release positions, thereby improving ease of use for a user. Furthermore, the disclosed methods, apparatus and articles of manufacture enable the adjustable capture plate to be adjusted for different sizes of the trailer pin box. As such, the disclosed methods, apparatus and articles of manufacture reduce the need to manufacture multiple capture plates for the different sizes of the trailer pin box, thus reducing a number of parts required.

Example 1 includes a capture plate including a skid plate couplable to a fifth wheel hitch, and a clamping system including a base coupled to the skid plate, a pressure plate slidably coupled to the base, and a crank arm coupled to the pressure plate via a link, wherein rotation of the crank arm about an anchor pin of the base corresponds to linear travel of the pressure plate along the base, the pressure plate movable between a first position in which the pressure plate engages a pin box of a trailer and a second position in which the pressure plate is positioned away from the pin box.

Example 2 includes the capture plate of Example 1, where the clamping system prevents rotation of the pin box relative to the skid plate when the pressure plate engages the pin box.

Example 3 includes the capture plate of Example 1, where the pressure plate includes a flanged wall to engage the pin box when the pressure plate is in the first position, the flanged wall to curve away from the pin box toward a front of the skid plate.

Example 4 includes the capture plate of Example 3, where a clamping force of the flanged wall on the pin box is adjustable by positioning a bolt within a slot of the pressure plate.

Example 5 includes the capture plate of Example 1, where the skid plate includes first openings, the crank arm including second openings, the first openings substantially aligned with the second openings when the pressure plate is in the first position.

Example 6 includes the capture plate of Example 5, and further includes a clevis pin to be inserted in the first and second openings to lock the crank arm when the pressure plate is in the first position.

Example 7 includes the capture plate of Example 1, where the crank arm is manually operated, the crank arm including a flanged handle, a toggle-like action of the crank arm to increase a mechanical advantage of the clamping system.

Example 8 includes the capture plate of Example 1, where the clamping system is a first clamping system, further including a second clamping system coupled to the skid plate, the first and second clamping systems positioned at opposite ends of the skid plate.

Example 9 includes an apparatus including a skid plate, and first and second clamping systems coupled to the skid plate at opposite ends of the skid plate, the first and second clamping systems movable between a clamped position and a release position, the first and second clamping systems in the clamped position spaced apart by a first distance, the first and second clamping systems in the release position spaced apart by a second distance, the second distance greater than the first distance, each of the first and second clamping systems including a base track fixedly coupled to the skid plate, a pressure plate coupled to the base track via a piston slidable within the base track, and a crank arm rotationally coupled to the piston via a link, wherein rotation of the crank arm about an anchor pin disposed in the base track causes linear travel of the pressure plate between the clamped position and the release position.

Example 10 includes the apparatus of Example 9, where the skid plate is coupled to a fifth wheel hitch, the first and second clamping systems in the clamped position to engage a pin box of a trailer to prevent rotation of the pin box relative to the skid plate.

Example 11 includes the apparatus of Example 10, where the pressure plate includes a flanged wall to engage the pin box when the pressure plate is in the clamped position, the flanged wall to curve away from the pin box toward a front of the skid plate.

Example 12 includes the apparatus of Example 11, where a clamping force of the flanged wall on the pin box is adjustable by positioning a bolt within a slot of the pressure plate.

Example 13 includes the apparatus of Example 9, where the skid plate includes first openings, the crank arm including second openings, the first openings substantially aligned with the second openings when the pressure plate is in the clamped position.

Example 14 includes the apparatus of Example 13, and further includes a clevis pin to be inserted in the first and second openings to lock the crank arm when the pressure plate is in the clamped position.

Example 15 includes the apparatus of Example 9, where the crank arm is manually operated, the crank arm including a flanged handle, a toggle-like action of the crank arm to increase a mechanical advantage of the first and second clamping systems.

Example 16 includes a method including coupling a clamping system to a skid plate by coupling a base to the skid plate, coupling a pressure plate to the base, the pressure plate slidable relative to the base, and coupling a crank arm to the pressure plate via a link, wherein rotation of the crank arm about an anchor pin of the base corresponds to linear travel of the pressure plate relative to the base, the pressure plate movable between a first position in which the pressure plate engages a pin box of a trailer and a second position in which the pressure plate is positioned away from the pin box.

Example 17 includes the method of Example 16, and further includes coupling a piston between the pressure plate and the base, the piston slidable within a track of the base.

Example 18 includes the method of Example 17, and further includes positioning a slot in the pressure plate, wherein a clamping force of the pressure plate on the pin box is adjustable by positioning a bolt within the slot, the bolt to couple the pressure plate to the piston.

Example 19 includes the method of Example 16, where the clamping system is a first clamping system, further including coupling a second clamping system to the skid plate, the first and second clamping systems positioned at opposite ends of the skid plate.

Example 20 includes the method of Example 16, and further includes coupling the skid plate to a fifth wheel hitch.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A capture plate comprising:

a skid plate couplable to a fifth wheel hitch; and a clamping system including:

- a base coupled to the skid plate;
- a pressure plate slidably coupled to the base; and
- a crank arm coupled to the pressure plate via a link, wherein rotation of the crank arm about an anchor pin of the base corresponds to linear travel of the pressure plate along the base, the pressure plate movable between a first position in which the pressure plate engages a pin box of a trailer and a second position in which the pressure plate is positioned away from the pin box.

2. The capture plate of claim 1, wherein the clamping system prevents rotation of the pin box relative to the skid plate when the pressure plate engages the pin box.

3. The capture plate of claim 1, wherein the pressure plate includes a flanged wall to engage the pin box when the pressure plate is in the first position, the flanged wall to curve away from the pin box toward a front of the skid plate.

4. The capture plate of claim 3, wherein a clamping force of the flanged wall on the pin box is adjustable by positioning a bolt within a slot of the pressure plate.

5. The capture plate of claim 1, wherein the skid plate includes first openings, the crank arm including second openings, the first openings substantially aligned with the second openings when the pressure plate is in the first position.

6. The capture plate of claim 5, further including a clevis pin to be inserted in the first and second openings to lock the crank arm when the pressure plate is in the first position.

7. The capture plate of claim 1, wherein the crank arm is manually operated, the crank arm including a flanged handle, a toggle-like action of the crank arm to increase a mechanical advantage of the clamping system.

8. The capture plate of claim 1, wherein the clamping system is a first clamping system, further including a second clamping system coupled to the skid plate, the first and second clamping systems positioned at opposite ends of the skid plate.

9. An apparatus comprising:

a skid plate; and first and second clamping systems coupled to the skid plate at opposite ends of the skid plate, the first and second clamping systems movable between a clamped position and a release position, the first and second clamping systems in the clamped position spaced apart by a first distance, the first and second clamping systems in the release position spaced apart by a second distance, the second distance greater than the first distance, each of the first and second clamping systems including:

- a base track fixedly coupled to the skid plate;
- a pressure plate coupled to the base track via a piston slidable within the base track; and
- a crank arm rotationally coupled to the piston via a link, wherein rotation of the crank arm about an anchor pin disposed in the base track causes linear travel of the pressure plate between the clamped position and the release position.

10. The apparatus of claim 9, wherein the skid plate is coupled to a fifth wheel hitch, the first and second clamping systems in the clamped position to engage a pin box of a trailer to prevent rotation of the pin box relative to the skid plate.

11. The apparatus of claim 10, wherein the pressure plate includes a flanged wall to engage the pin box when the pressure plate is in the clamped position, the flanged wall to curve away from the pin box toward a front of the skid plate.

12. The apparatus of claim 11, wherein a clamping force of the flanged wall on the pin box is adjustable by positioning a bolt within a slot of the pressure plate.

13. The apparatus of claim 9, wherein the skid plate includes first openings, the crank arm including second openings, the first openings substantially aligned with the second openings when the pressure plate is in the clamped position.

14. The apparatus of claim 13, further including a clevis pin to be inserted in the first and second openings to lock the crank arm when the pressure plate is in the clamped position.

15. The apparatus of claim 9, wherein the crank arm is manually operated, the crank arm including a flanged handle, a toggle-like action of the crank arm to increase a mechanical advantage of the first and second clamping systems.

16. A method comprising:

coupling a clamping system to a skid plate by:

- coupling a base to the skid plate;
- coupling a pressure plate to the base, the pressure plate slidable relative to the base; and
- coupling a crank arm to the pressure plate via a link, wherein rotation of the crank arm about an anchor pin of the base corresponds to linear travel of the pressure plate relative to the base, the pressure plate movable between a first position in which the pressure plate engages a pin box of a trailer and a second position in which the pressure plate is positioned away from the pin box.

17. The method of claim 16, further including coupling a piston between the pressure plate and the base, the piston slidable within a track of the base.

18. The method of claim 17, further including positioning a slot in the pressure plate, wherein a clamping force of the pressure plate on the pin box is adjustable by positioning a bolt within the slot, the bolt to couple the pressure plate to the piston.

19. The method of claim 16, wherein the clamping system is a first clamping system, further including coupling a second clamping system to the skid plate, the first and second clamping systems positioned at opposite ends of the skid plate.

20. The method of claim 16, further including coupling the skid plate to a fifth wheel hitch.

* * * * *